United States Patent [19]

Kirschner

[11] 4,358,148

[45] Nov. 9, 1982

[54] DAMPED RAILWAY WHEEL

[75] Inventor: Francis Kirschner, East Hills, N.Y.

[73] Assignee: The Soundcoat Company, Inc., Brooklyn, N.Y.

[21] Appl. No.: 196,649

[22] Filed: Oct. 14, 1980

[51] Int. Cl.³ .............. B60B 7/04; B60B 17/00; B60B 19/00; F16H 55/14

[52] U.S. Cl. .............. 295/7; 74/443; 295/15; 301/5 B; 301/6 WB

[58] Field of Search ........... 74/432, 443; 295/7, 295/15; 301/5 B, 37 C, 37 CD, 37 T, 6 WB

[56] References Cited

U.S. PATENT DOCUMENTS

| 734,417 | 7/1903 | Hubbell | 301/5 B |
|---|---|---|---|
| 1,695,529 | 12/1928 | Brownyer | 295/7 X |
| 1,804,906 | 5/1931 | Wemp | 74/443 |
| 1,972,678 | 9/1934 | Bourdon | 295/7 |
| 3,080,771 | 3/1963 | Baldwin | 74/443 X |
| 3,126,760 | 3/1964 | Peirce | 74/443 X |
| 3,377,097 | 4/1968 | Swanson | 295/7 |
| 3,890,008 | 6/1975 | Lejeune | 305/5 B |
| 4,183,572 | 1/1980 | Albrecht et al. | 295/15 X |
| 4,254,985 | 3/1981 | Kirschner | 295/7 |

FOREIGN PATENT DOCUMENTS 1605832 11/1970 Fed. Rep. of Germany .......... 295/7

OTHER PUBLICATIONS

Kirschner, Francis; "New Developments in the Control of Railroad Wheel Screech Noise"; Inter-Noise 72 Proceedings, Oct. 4-6, 1972, pp. 225-230.
Kirschner, F.; "New Materials for Vibration Damping Control"; Inter-Noise 75; Aug. 27-29, 1975; pp. 499-506.

Primary Examiner—Robert B. Reeves
Assistant Examiner—Howard Beltran
Attorney, Agent, or Firm—Robert Scobey

[57] ABSTRACT

A vibration damping assembly for a wheel or the like that undergoes rotation is achieved by providing an annular groove in a surface of the wheel coaxial with the wheel axis. An annular metal ring formed from a channel member generally U-shaped in cross-section is positioned with one of its legs within the annular groove substantially encased therein by a vibration damping material. The remainder of the channel member extends close to areas of the wheel that are adjacent to the groove, and vibration damping material is sandwiched between the wheel and the channel member. Vibration damping material subject to shear deformation during rotation of the wheel is used, along with vibration damping material subject to deformation in tension and compression.

8 Claims, 3 Drawing Figures

U.S. Patent  Nov. 9, 1982  4,358,148
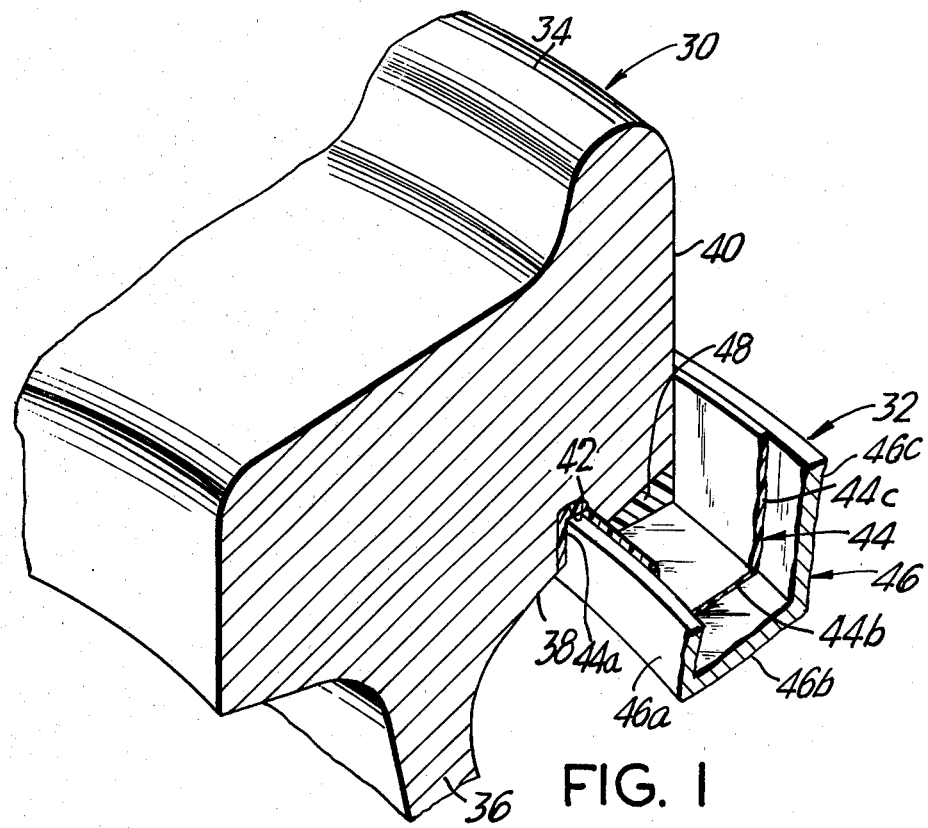
FIG. 1
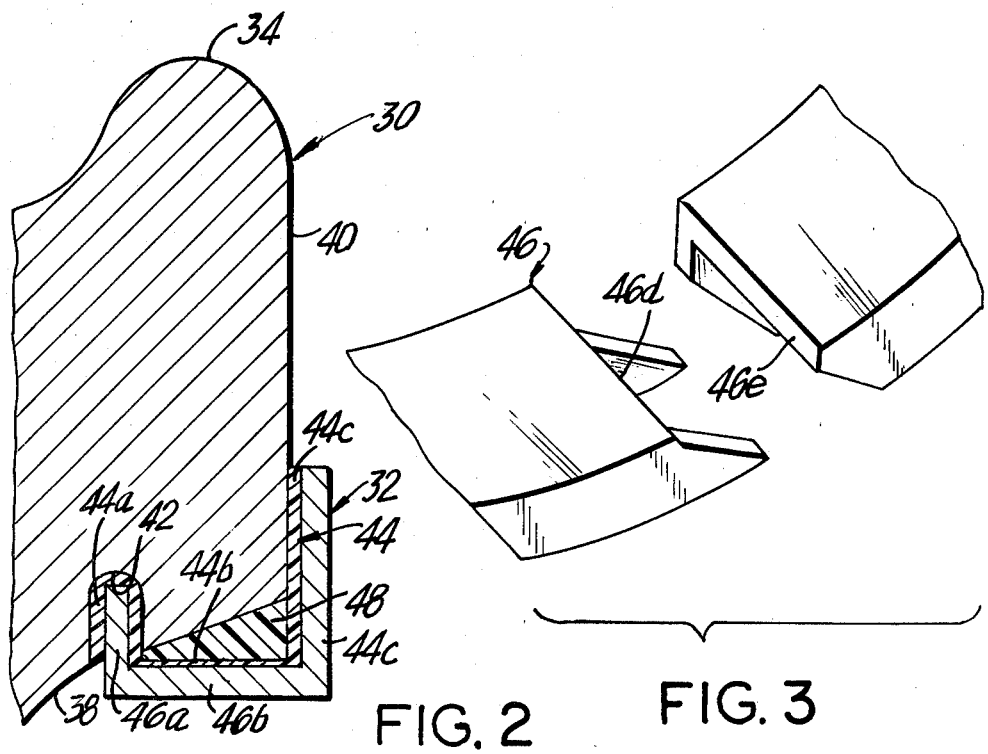
FIG. 2
FIG. 3

DAMPED RAILWAY WHEEL

CROSS REFERENCE TO RELATED APPLICATION

This application is related to my copending application Ser. No. 023,319 filed Mar. 23, 1979, now U.S. Pat. No. 4,254,985, issued Mar. 10, 1981.

BACKGROUND AND BRIEF DESCRIPTION OF THE INVENTION

This invention relates to the damping of vibration, and more particularly to the damping of vibration in rotating devices. The invention has particular application to the attenuation of screech noise from railroad wheels.

Assemblies for damping vibration in rotating devices are known. Many involve the use of relatively heavy damping assemblies, which is undesirable from the standpoint of adding an additional load to the rotating device as well as safety. In the present invention, a lightweight damping assembly is provided.

The related application cross-referenced above involves a vibration damping assembly for a wheel or the like that includes an annular groove in a surface of the wheel and coaxial with the wheel axis. A viscoelastic damping material subject to shear deformation during rotation of the wheel is positioned within the groove against the surface of the groove, and an annular metal ring is positioned in the groove against the viscoelastic damping material, with the damping material sandwiched between the ring and wheel. It was indicated in that application that it is preferable to position the damping assembly on the wheel so that it does not extend outwardly beyond the plane defining the edge of the wheel so as to protect the damping assembly from external forces that might damage it.

The present invention involves a vibration damping assembly similar to that of the related application cross-referenced above. It utilizes an annular groove in a surface of the wheel, in which one leg of a channel member generally U-shaped cross-section is positioned, substantially encased therein by a vibration damping material. The remaining portion of the channel member extends close to areas of the wheel that are adjacent to the groove, and vibration damping material is sandwiched between these adjacent areas and the channel member. Preferably, the annular groove is in the inner rim area of the wheel, adjacent to the outer rim area, and the channel member is positioned so that one leg thereof is encased, as noted, within the groove by vibration damping material, while the other leg thereof extends adjacent to the outer rim area of the wheel. By sandwiching damping material beneath the entire channel member, greater vibration damping is achieved than possible through the use only of vibration damping material within the annular groove as in the cross-referenced application. The vibration damping material utilized herein may be material which is subject to shear deformation as the wheel is rotated, as well as material which is subject to deformation in tension and compression. The damping assembly is firmly positioned on the wheel, and is not subject to being damaged or dislodged easily by external forces, and so may extend beyond the plane of the edge of the wheel.

The invention will be more completely understood by reference to the following detailed description.

BRIEF DESCRIPTION OF THE DRAWING

FIG. 1 is a perspective view, in section, of a portion of a railroad wheel embodying the invention.

FIG. 2 is a side view, to an enlarged scale, of a portion of the section shown in FIG. 1.

FIG. 3 is a perspective view of the end of an annular metal ring used in the assembly of FIG. 1 (to an enlarged scale).

DETAILED DESCRIPTION

Referring to FIG. 1, a railroad wheel 30 is shown that has affixed thereto a vibration damping assembly 32 in accordance with the invention. The wheel includes a flange portion 34, a web portion 36, an inner rim portion 38, and an outer rim portion 40. The vibration damping assembly 32 is positioned in the rim portion of the wheel, as shown.

An annular groove 42 is formed in the inner rim portion 38 of the wheel, typically by machining (see FIGS. 1 and 2). A visco-elastic damping material 44a is positioned within the groove 42, and substantially encases one leg 46a of a channel member 46 which is generally U-shaped in cross-section. Base portion 46b and the other leg 46c of the channel member extend close to areas of the wheel that are adjacent to the groove 42. In particular, the base portion 46b extends outwardly to the edge of the wheel, while the leg 46c extends adjacent to the outer rim portion 40. These portions of the channel member 46 sandwich vibration damping material between themselves and the adjacent portions of the wheel. In particular, the vibration damping material 44 may extend along base portion 46b and leg 46c, as at 44b and 44c. Other vibration damping material 48 may be included sandwiched between the vibration damping material 44b and the adjacent inner rim portion 38 of the wheel.

Typically, the damping assembly 32 may be formed by first positioning damping material 48 in place against the wheel, followed by damping material 44a, 44b, and 44c. Next, the channel member 46, which is annular and of metal, preferably of spring steel, is "snapped" in place. The ring 46 may be cut so as to include two discrete ends 46d and 46e shown in FIG. 3, cut and shaped as shown to interfit one against the other. These ends may abut each other, they may be spaced slightly apart, and they may be welded together, as desired in the final assembly.

In the railroad wheel and damping assembly just described, the wheel itself is typically about 28 inches in diameter and approximately 500 pounds in weight. The channel member 46 is preferably of tempered, spring steel, and may be of the same steel as that of the railroad wheel 10. The width of the base 46b of the channel member may be 1½ inches, and the height of the leg 46c may be the same. The leg 46a may be ¾ inch in height, while the annular groove 42 may extend inwardly into the inner rim area 38 by about 9.16 inch, with a rounded inner radius of about ½ inch. These dimensions are given by way of example only.

The damping material 44a, 44b, and 44c may preferably be viscoelastic damping material subject to shear deformation during rotation of the wheel. A suitable product is manufactured by The Soundcoat Company, Inc., of 175 Pearl Street, Brooklyn, New York 11201, United States of America, under product designation DYAD. Bulletin 701 published by The Soundcoat Company, Inc. and entitled "Soundcoat Product Data Sheet, DYAD For Use In Thick Plate Vibration Damping" describes DYAD material and applications. Further Soundcoat Company publications describing viscoelastic damping material applications are as follows:

"Materials for Constrained-Layer Damping"
"New Materials for Vibration Damping Control" by F. Kirschner, and published in Inter-Noise 75.
"New developments In The Control Of Railroad Wheel Screech Noise" by Francis Kirschner, and published in Inter-Nose 72 Proceedings.

The damping material 48 preferably may be a 100° solid epoxy resin with a mixture of inorganic fillers. An example of such a resin is "Epoxy 10", a product made by the The Soundcoat Company, Inc., 175 Pearl Street, Brooklyn, New York 11201. Such a material is described in Bulletin 705 published by The Soundcoat Company, Inc., and entitled "Epoxy-10 Vibration Damping Compound". The damping material 48 may itself serve as an adhesive, bonding itself to the vibration damping material 44a, 44b, and 44c in contact therewith as well as to the rim portion 38 of the wheel. It also serves as a temperature insulating medium. The material 48 is, however, a vibration damping material which acts in tension and compression in a mode transverse to the direction of rotation of the wheel.

In making the damping assembly 32, it is preferable to coat the channel 42 and the inner and outer rim areas 38 and 40 with an adhesive material. A suitable adhesive is a flexible epoxy adhesive sold by The Soundcoat Company, Inc., under its product designation "Soundcoat B-Flex Epoxy", described in "Application Instructions" of "Soundcoat B-Flex Epoxy" published by The Soundcoat Company, Inc. The adhesive layer serves to hold the damping layer 44 of the viscoelastic damping material in place. Additionally, it serves to bond the damping material 48 to the wheel. That damping layer as well as the damping material 44b, 44b, and 44c may itself be coated with adhesive material, of the type just described, so that all elements of the assembly are firmly bonded together to create a sandwich of damping materials and channel member.

The damping assembly 32 as described above generally may weigh no more than about 12 pounds (the weight of the channel member 46). This compares with a wheel weight of about 500 pounds, and hence the damping assembly is virtually a negligible weight addition to the wheel (less than about 2½ by weight).

A presently preferred embodiment of the invention has been described in detail above. The damping system disclosed may be optimized in terms of frequency, temperature, and geometrical configuration. The publications noted above are of assistance in optimizing the damping treatment in any particular application.

In view of the above, the invention should be taken to be defined by the following claims.

I claim:

1. In a vibration damping assembly for a member that undergoes rotation, and which includes an annular groove in an interior surface of said member which is coaxial with the axis of said member, the improvement comprising an annular metal ring formed from a channel member generally U-shaped in cross-section so as to include two legs and a base, one of the legs of said channel member being positioned within said groove and substantially encased therein by a vibration damping material, the base of said channel member extending adjacent to said interior surface of said rotatable member, the other leg of said channel member extending adjacent to an exterior surface of said rotatable member, and vibration damping material sandwiched between said base and other leg of said channel member and the adjacent surfaces of said rotatable member.

2. A vibration damping assembly according to claim 1, in which said vibration damping material comprises material which is subject to shear deformation during rotation of said rotatable member.

3. A vibration damping assembly according to claim 1, in which at least some of said vibration damping material comprises a sandwich of a first material which is subject to deformation in tension and compression and a second material which is subject to shear deformation during rotation of said rotatable member.

4. A vibration damping assembly according to claim 1, in which said rotatable member includes inner and outer rim areas, said annular groove is positioned within said inner rim area of said rotatable member, and the other leg of said U-shaped channel member extends adjacent to said outer rim area of said rotatable member.

5. A vibration damping assembly according to claim 4, including viscoelastic material subject to shear deformation positioned between said outer rim area of said rotatable member and said other leg of said U-shaped channel member.

6. A vibration damping assembly according to claim 5, including vibration damping material subject to deformation in tension and compression positioned between the base of said U-shaped channel member and said inner rim area of said rotatable member.

7. A vibration damping assembly according to claim 6, in which viscoelastic material subject to shear deformation is sandwiched between said vibration damping material and said base of said U-shaped channel member.

8. A vibration damping assembly according to claim 7, in which said annular metal ring is split and includes mating ends.

* * * * *